United States Patent [19]

Kemp

[11] Patent Number: 4,528,739
[45] Date of Patent: Jul. 16, 1985

[54] RIVET AND METHOD OF USING THE SAME

[75] Inventor: James M. Kemp, Beloit, Wis.

[73] Assignee: Atwood Vacuum Machine Company, Rockford, Ill.

[21] Appl. No.: 481,346

[22] Filed: Apr. 1, 1983

[51] Int. Cl.³ .................... B21D 39/00; B23P 19/00
[52] U.S. Cl. .................................. 29/509; 29/522 A; 29/526 A; 411/504
[58] Field of Search .................... 29/509, 512, 522 R, 29/522 A, 526 A; 411/501, 504, 505

[56] References Cited

U.S. PATENT DOCUMENTS

| | | | |
|---|---|---|---|
| 3,270,410 | 9/1966 | Salter et al. | 29/446 |
| 3,505,923 | 4/1970 | Neill | 411/501 |
| 4,007,540 | 2/1977 | Tyree | 29/509 |
| 4,221,041 | 9/1980 | Hufnagl et al. | 411/501 |
| 4,223,433 | 9/1980 | Rosman | 29/509 |
| 4,286,371 | 9/1981 | Falcioni | 29/509 |

Primary Examiner—Mark Rosenbaum
Assistant Examiner—Steven Nichols
Attorney, Agent, or Firm—Leydig, Voit, Osann, Mayer & Holt, Ltd.

[57] ABSTRACT

A rivet having a cylindrical head portion, a cylindrical shoulder portion of reduced diameter and a tenon portion of further reduced diameter is projected through first and second parts which are to be fastened together. The head portion abuts one side of the first part, the shoulder portion extends a substantial distance through an opening in the first part and the tenon portion projects through and beyond a hole in the second part. An axial bore opens through the head portion and extends into the shoulder portion but stops short of the tenon portion, the bore terminating in an end wall. A first tool is projected into the bore and bears against the end wall to place substantially all of the shoulder portion in tension and to hold the rivet while a second tool engages the tenon portion to deform the latter and form an enlargement engaging the second part, the tenon portion thereby being in compression. The force of tension is greater than the force of compression so that the residual force in the rivet after the latter has been released by the tools is a tensile force.

2 Claims, 4 Drawing Figures

4,528,739

RIVET AND METHOD OF USING THE SAME

BACKGROUND OF THE INVENTION

This invention relates to a rivet for fastening a first part to a second part and, more particularly, to a rivet which includes a head portion engaging one side of the first part, a cylindrical shoulder portion extending through an opening in the first part, and a tenon portion projecting through and beyond a hole in the second part. Axially opposed forming tools engage the rivet and the metal of the tenon portion flows to form an enlargement so that the two parts are fastened together between the head portion and the enlargement.

SUMMARY OF THE INVENTION

The general object of the invention is to fasten two parts by a rivet in a novel manner so that at least one of the parts is not subjected to a deforming force caused by the rivet swelling and, at the same time, the rivet holds the two parts together with a clamping force.

Another object is to accomplish the foregoing through the use of a novel rivet which is formed with an axial bore opening through the end of the head portion and extending substantially all the way through the shoulder portions, the bore terminating in an end wall engageable by one of the forming tools.

Another object is to utilize the novel rivet in an improved method in which the shoulder portion of the rivet projects loosely through the opening in the first part, one tool bears only on the end wall of the bore to create a tension force in the shoulder portion, a second tool coacts with the first tool to create a compression force in the tenon portion and form the enlargement, and the compression force is smaller than the tension force so that the residual force after the tools have released the rivet is a tension or clamping force.

DETAILED DESCRIPTION OF THE PREFERRED EMBODIMENT

Figure 1:
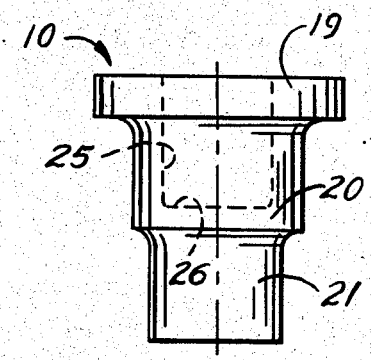
FIG. 1 is a side view of a rivet embodying the present invention.
Figure 2:
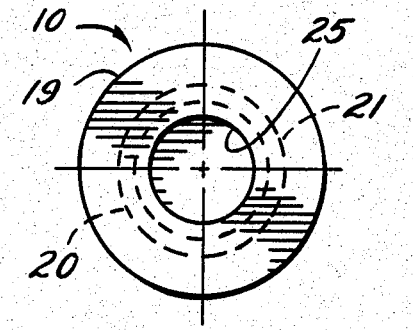
FIG. 2 is an end view of the rivet as seen from the top in FIG. 1.
Figure 3:
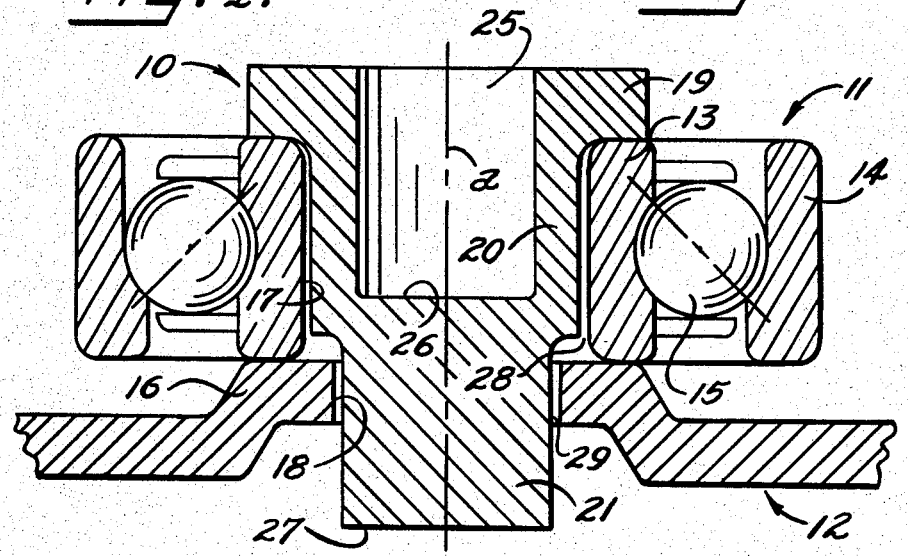
FIG. 3 is an enlarged sectional view of the rivet in place in the two parts to be fastened but before being engaged by the forming tools.
Figure 4:
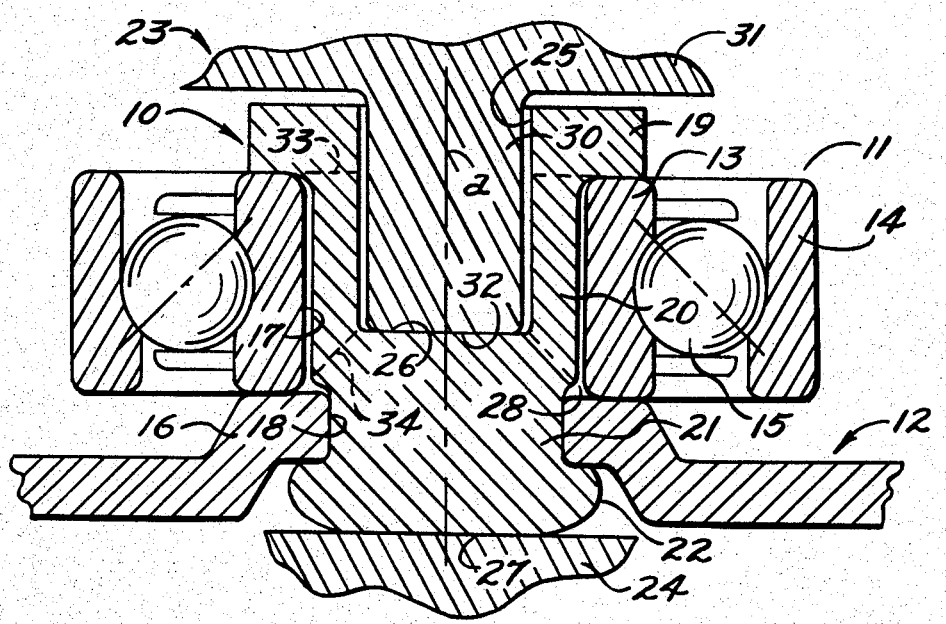
FIG. 4 is a view similar to FIG. 3 but illustrates the tools and shows the rivet after being operated upon by the tools.

As shown in the drawings for purposes of illustration, the invention is embodied in a rivet 10 used to fasten two parts together such, for example, as a bearing 11 and a sheet metal bracket 12. In the form shown, the bearing includes inner and outer races 13 and 14 defining an annular track for a train of bearing balls 15 and the inner race bears against an annular hub 16 on the bracket 12. The inner race defines an axial opening or bore 17 which extends through from the top to the bottom of the race and is alined with a hole 18 in the bracket. The rivet includes a head portion 19 which bears against the top side of the inner race, a shoulder portion 20 disposed in the bore 17 and a tenon portion 21 which projects through and beyond the hole 18 and is deformed to make an enlargement 22 (FIG. 4). The latter cooperates with the head portion to attach the bracket and the inner race together.

The present invention contemplates the provision of a new and improved rivet 10 and of a novel method of applying the rivet so that, when the riveting has been completed, the rivet is in tension between the head portion 19 and the enlargement 22. This eliminates the need for a press fit between the rivet and a part like the inner race 13 and it also eliminates swelling of the rivet against the inside of the part. As a result, the riveting process does not deform the part and this is particularly advantageous where the part is the race of a bearing.

To achieve the foregoing, essentially only the tenon portion 21 is compressed between the riveting or forming tools 23 and 24 while the riveting produces a tension force in the shoulder portion 20 and the tension force is greater than the compression force so that the residual load between the head portion 19 and the enlargement 22 is a tension force. In other words, the parts 11 and 12 actually are clamped between the head portion and the enlargement. For this purpose, the rivet is formed with an axial bore 25 which opens through the head portion and which extends through the latter and substantially all the way through the shoulder portion 20, the inner end wall 26 of the bore being disposed just short of the tenon portion 21. The tools 23 and 24 act respectively on the end wall 26 and the free end surface 27 of the tenon portion to cause the metal of the latter to flow into the formation of the enlargement 22 and, at the same time, to produce the tension force in the shoulder portion and the smaller compression force in the tenon portion.

More specifically, the shoulder portion 20 fits loosely in the bore 25 of the bearing 11 and, preferably, there actually is a clearance 28 between the shoulder portion and the inside of the inner race 13. Herein, there also is a clearance 29 between the tenon portion 21 and the side of the hole 18 in the bracket 12. The tool 23 includes an elongated cylindrical projection 30 formed integrally with the body 31 of the tool and extending along the axis a of the inner race 13. The projection is smaller in diameter than the bore 25 and is longer than the latter so that the body 31 always is spaced above the head portion 19 of the rivet 10 and the end surface 32 of the projection is the only part of the tool engaging the rivet, that surface engaging the end wall 26 of the bore. As the tool bears against this wall, it causes the head portion 19 to be pressed against the inner race 13 and stretches the shoulder portion 20 causing the major portion of the latter to be placed in tension. Basically, that part of the shoulder portion between the lines 33 and 34 in FIG. 4 is subject to the tension force and, although this force is appreciable in magnitude, it is not so large as to stretch the shoulder portion beyond its elastic limit.

With the tool 23 bearing against the end wall 26 of the bore 25 and placing the shoulder portion 20 in tension, the tool 24 is moved against the axially facing end surface 27 of the tenon portion 21. This causes the metal of the latter to flow to fill in the hole 18 at the clearance 29 and to form the enlargement 22. In addition to this elastic deformation, the portion of the rivet 10 beyond the line 34 is in compression when both tools are still engaging the rivet. The force of this compression, however, is less than the tension force in the shoulder portion so that, when the tools release the rivet, the compression force cancels only a part of the tension force and the residual force in the rivet between the head portion 19 and the enlargement 22 is a tension force.

Thus, the inner race 13 and the bracket 12 are clamped together between the head and the enlargement. Although the tenon portion is permanently deformed, the shoulder portion is not and the clearance 28 remains when the riveting has been completed.

It will be seen that a rivet 10 constructed and employed in the manner described above eliminates the possibility of the rivet swelling or enlarging at the portion which is in tension, that is, the shoulder portion 20 inside the inner race 13 of the bearing 11. In addition, the rivet does not require a press fit in the inner race. Accordingly, the riveting process does not deform the bearing. At the same time, the bearing and the bracket 12 are retained between the head portion 19 and the enlargement 22 with a clamping action.

I claim:

1. The method of fastening a first part having a cylindrical opening to a second part having a circular hole, said opening extending through said first part from one side thereof to the other side and said second part abutting said other side of the first part with said opening and said hole being axially alined, said method comprising the steps of, projecting an elongated rivet through said opening and said hole, said rivet having an enlarged head portion disposed outside said one side of said first part and abutting the latter side, said rivet also having a cylindrical shoulder portion projecting loosely into said opening but stopping short of said second side and having a cylindrical tenon portion extending beyond said shoulder portion, said tenon portion projecting through and beyond said hole and being smaller in diameter than the hole, said rivet having an axial bore opening through the outer end of said head portion and projecting into said shoulder portion but stopping short of said tenon portion, projecting an enlongated tool into said bore to bear against the inner end of said bore to press said head portion against said first part and to produce a tension force in at least the major portion of said shoulder portion, and moving a second tool axially against the free end of said tenon portion to deform the latter whereby the tenon portion substantially fills said hole and forms an enlargement overlying the outside of said second part around the hole, said second tool producing a compression force in said tenon portion smaller than said tension force whereby the rivet is in tension between said head portion and said enlargement after the tools have been removed.

2. The method of fastening a first part having a cylindrical opening to a second part having a circular hole, said opening extending through said first part from one side thereof to the other side and said second part abutting said other side of the first part with said opening and said hole being axially alined, said method comprising the steps of, projecting an elongated rivet through said opening and said hole, said rivet having an enlarged annular head larger than said opening disposed outside said one side of said first part and abutting the latter side, said rivet also having a cylindrical shoulder portion of reduced diameter projecting loosely into said opening but stopping short of said second side and having a cylindrical tenon portion of still further reduced diameter extending beyond said shoulder portion, said tenon portion projecting through and beyond said hole and being smaller in diameter than the hole, said rivet having an axial bore opening through the outer end of said head portion and projecting into said shoulder portion but stopping short of said tenon portion, projecting an elongated tool into said bore to bear against the inner end of said bore to press said head portion against said first part and to produce a tension force in at least the major portion of said shoulder portion without exceeding the elastic limit of the latter, and moving a second tool axially against the free end of said tenon portion to deform the latter whereby the tenon portion substantially fills said hole and forms an enlargement overlying the outside of said second part around the hole, said second tool producing a compression force in said tenon portion smaller than said tension force whereby the rivet is in tension between said head portion and said enlargement after the tools have been removed.

* * * * *